United States Patent
Prewitt (10) Patent No.: US 9,523,214 B2
(45) Date of Patent: Dec. 20, 2016

(54) AWNING AIRFOIL

(71) Applicant: Phillip Ross Prewitt, Albany, OR (US)

(72) Inventor: Phillip Ross Prewitt, Albany, OR (US)

(73) Assignee: Phillip Ross Prewitt, Los Gatos, CA (US)

( * ) Notice: Subject to any disclaimer, the term of this patent is extended or adjusted under 35 U.S.C. 154(b) by 40 days.

(21) Appl. No.: 14/679,171

(22) Filed: Apr. 6, 2015

(65) Prior Publication Data

US 2016/0289991 A1 Oct. 6, 2016

(51) Int. Cl.
| | |
|---|---|
| *E04H 15/58* | (2006.01) |
| *E04F 10/02* | (2006.01) |
| *E04D 13/15* | (2006.01) |
| *F16B 2/12* | (2006.01) |

(52) U.S. Cl.
CPC ............... *E04H 15/58* (2013.01); *E04D 13/15* (2013.01); *E04F 10/02* (2013.01); *F16B 2/12* (2013.01)

(58) Field of Classification Search
CPC .......... E04H 15/32; E04H 15/64; E04H 15/08; E04H 15/58; F16B 2/12; F16B 5/0635; E04F 10/02; E04F 10/04
USPC ......... 135/88.1–88.12, 117, 119, 161, 120.3; 160/66–69, 269, 268.1, 46; 248/229.25, 248/229.26, 229.12, 229.17, 229.2, 249, 230.6, 248/231.7; 297/163
See application file for complete search history.

(56) References Cited

U.S. PATENT DOCUMENTS

| | | | | |
|---|---|---|---|---|
| 297,667 | A | * 4/1884 | Brown | A44C 7/006 160/268.1 |
| 4,115,966 | A | * 9/1978 | DeLee | G09F 7/18 248/229.26 |
| 4,565,230 | A | * 1/1986 | Van Rijn | A01G 9/22 160/84.01 |
| 4,682,618 | A | * 7/1987 | Zwick | B60P 3/341 135/119 |
| 5,314,153 | A | 5/1994 | White | |
| 5,369,850 | A | * 12/1994 | Noble | B21D 1/145 135/88.12 |
| 5,592,982 | A | 1/1997 | Murray et al. | |
| D386,076 | S | * 11/1997 | Moore | D8/394 |
| 5,909,761 | A | 6/1999 | Murray | |
| 6,179,513 | B1 | 1/2001 | Marasco | |
| 6,871,685 | B2 | 3/2005 | Freney | |
| 7,063,227 | B2 | * 6/2006 | Looker | B65D 88/14 160/269 |
| 8,833,034 | B2 | * 9/2014 | Gorman | E06B 9/02 248/316.7 |
| 8,997,769 | B2 | * 4/2015 | Carpenter | F02B 63/048 135/161 |

(Continued)

OTHER PUBLICATIONS

SunBuster Solar Shades Pty Ltd., "Roof Tension Rafter | SunBuster", http://www.sunbuster.net.au/services/rooftensionrafter/, Mar. 4, 2015, 3 pages.

(Continued)

*Primary Examiner* — Winnie Yip (74) *Attorney, Agent, or Firm* — Fish & Richardson P.C.

(57) ABSTRACT

This document provides an apparatus including an awning fastener configured for attaching to an awning. The apparatus can further include a first airfoil connected to the awning fastener. The apparatus can further include a second airfoil connected to the awning fastener and positioned opposite of the first airfoil such that the first and second airfoils are positionable on opposite sides of the awning when the awning fastener is connected to the awning.

20 Claims, 5 Drawing Sheets

(56) References Cited

U.S. PATENT DOCUMENTS

| | | | |
|---|---|---|---|
| 9,212,784 B2* | 12/2015 | Frenal | F17C 13/084 |
| 2015/0219131 A1* | 8/2015 | Quintania | B25B 5/006 |
| | | | 248/230.6 |
| 2015/0345214 A1* | 12/2015 | Rupel | E06B 9/38 |
| | | | 160/89 |

OTHER PUBLICATIONS

CaravansPlus, "Caravan Awning Accessories | Caravansplus", http://caravansplus.com.au/catalog/index/php?cPath=21_544, Mar. 4, 2015, 6 pages.

Aussie Traveller, "Aussie Traveller >> Products", http://www.aussietraveller.com.au/pages/products/category/24/anti_flap_kits, Mar. 4, 2015, 2 pages.

* cited by examiner

AWNING AIRFOIL

TECHNICAL FIELD

This document relates to awnings, and more particularly to air flow with respect to awning fabric.

BACKGROUND

Awnings are commonly used in a variety of situations to provide shelter from sun and/or rain. For example, some awnings are commonly used as overhangs attached to a storefront, window, doorway, deck, or other structure. Awnings are commonly used in conjunction with houses and buildings as well as recreational vehicles.

Some awnings include a sheet of awning fabric, such as canvas or plastic, stretched and supported by a frame. The awning fabric can be angled so as to allow rain water to run off in one or more directions. The awning fabric of some awnings can cover a relatively large area, which can allow the awning to provide a relatively large amount of shelter from sun and rain but can also cause the awning fabric to catch wind. Wind can cause the awning fabric to flap. Wind that is relatively strong and directed from certain angles can cause the awning fabric to flap undesirably aggressively, which can damage the awning and can be loud and unpleasant for users under and nearby the awning.

SUMMARY

This document provides methods and materials related to awnings and awning systems. Some embodiments of an awning airfoil system provided herein can include one or more of the features and functions disclosed herein. For example, an awning airfoil system provided herein can spoil airflow so as to reduce flapping of awning fabric. In some cases, an awning airfoil system provided herein can include airfoils attached above and below an awning to spoil airflow on both sides of the awning.

In one aspect, an apparatus includes an awning fastener configured for attaching to an awning. The apparatus further includes a first airfoil connected to the awning fastener. The apparatus further includes a second airfoil connected to the awning fastener and positioned opposite of the first airfoil such that the first and second airfoils are positionable on opposite sides of the awning when the awning fastener is connected to the awning.

Implementations can include any, all, or none of the following features. The awning fastener includes first and second clamps configured for clamping to an awning edge, wherein the first airfoil is connected to tops of the first and second clamps, and wherein the second airfoil is connected to bottoms of the first and second clamps. A first leading edge of the first airfoil abuts a first alignment guide positioned on a top surface of the awning fastener and a second leading edge of the second airfoil abuts a second alignment guide positioned on a bottom surface of the awning fastener. The first airfoil has a first leading edge positioned proximate the awning fastener and is angled so as to have a first trailing edge spaced away from the awning fastener. The second airfoil has a second leading edge positioned proximate the awning fastener and is angled so as to have a second trailing edge spaced away from the awning fastener. Each of the first and second airfoils are curved with substantially concave surfaces, have a length of between about 24 inches and about 42 inches, and have a depth of between about 2 inches and about 4 inches. Each of the first and second airfoils are angled with respect to the awning fastener by greater than about 15 degrees, have a length of between about 24 inches and about 60 inches, and have a depth of between about 1 inch and about 6 inches. The awning fastener includes first and second arms and at least one pad pivotably attached to a first end of the first arm and facing toward a second end of the second arm. The awning fastener further includes a second pad rigidly attached to the second end of the second arm and facing toward the first pad, the first arm includes a first rim extending from a third end of the first arm toward a fourth end of the second arm, and the second arm includes a second rim extending from the fourth end toward the first rim. An adjustable connector extends through a first hole near a first leading edge of the first airfoil, through a second hole near a second leading edge of the second airfoil, and through at least one hole of the awning fastener. The adjustable connector is configured to connect the first and second airfoils to the awning fastener and to tighten the awning fastener to the awning. An awning has a first edge, and the awning fastener is connected to the awning proximate the first edge of the awning such that the first airfoil is positioned above a top surface of the awning and such that the second airfoil is positioned below a bottom surface of the awning. An assembly includes an awning having a first edge. The awning fastener is clamped to both an awning fabric and a side rail of the awning such that the awning fastener spans a gap extending between the awning fabric and the side rail.

In one aspect, a method includes positioning a first airfoil along a first edge of an awning above the awning. The method further includes positioning a second airfoil along the first edge of the awning below the awning. The method further includes attaching the first and second airfoils to the awning.

Implementations can include any, all, or none of the following features. The method including attaching the first and second airfoils to an awning fabric of the awning. The method including attaching the first and second airfoils to a side rail of the awning. The awning is a retractable awning attached to a side of a recreational vehicle and the side rail is a telescoping side rail of the awning. The method including attaching the first and second airfoils via a clamp that attaches to both an awning fabric and a side rail of the awning such that the clamp spans a gap extending between the awning fabric and the side rail. The method including attaching the first and second airfoils aligned substantially parallel to a side edge of the awning. The method including positioning a third airfoil along a second edge of the awning above the awning, positioning a fourth airfoil along the second edge of the awning below the awning, and attaching the first and second airfoils to the awning. The second edge is an edge of the awning opposite the first edge of the awning. The method includes attaching the first and second airfoils to a side rail of the awning such that first and second leading edges of the airfoils face toward the side rail and first and second trailing edges curve away from awning fabric of the awning.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
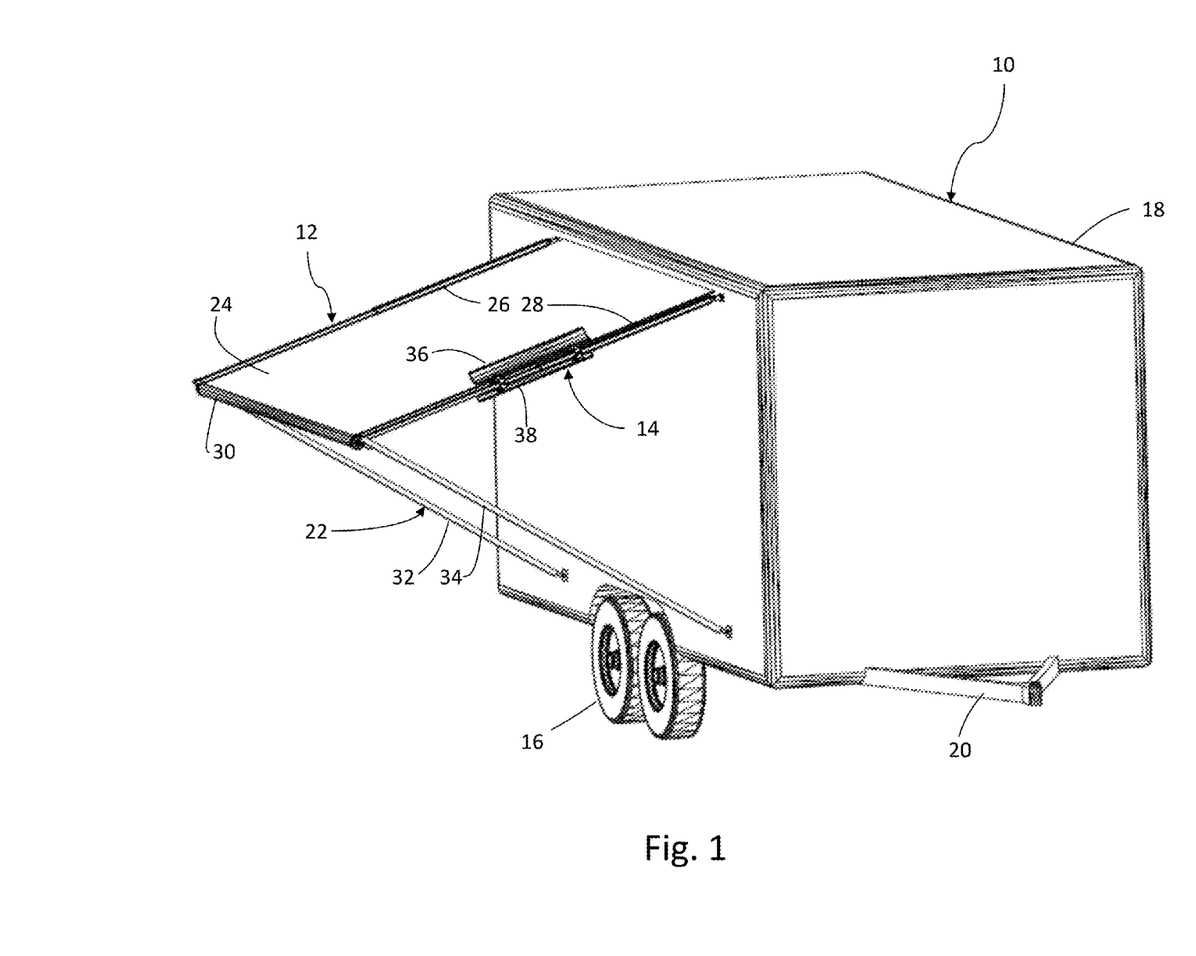
FIG. 1 is a schematic perspective view of a vehicle, awning, and awning airfoil system.

FIG. 1 is a schematic perspective view of vehicle 10, awning 12, and awning airfoil system 14. In some embodiments, awning airfoil system 14 can attach to awning 12 to spoil aerodynamic flow of air across awning 12 to reduce flapping by awning 12 during windy conditions.

Vehicle 10 can be a recreational vehicle (RV) having wheels 16 supporting vehicle body 18. In some embodiments, vehicle 10 can be a towable RV with trailer hitch 20. In other embodiments, vehicle 10 can be a motorized RV. Vehicle 10 includes awning 12 attached to a side of vehicle body 18.

Awning 12 includes awning frame 22 and awning fabric 24. Awning frame 22 can include side rails 26 and 28, end rail 30, and support rails 32 and 34. Awning frame 22 can stretch and support awning fabric 24. Awning fabric 24 can extend from the side of the vehicle body 18 to the end rail 30. Side rails 26 and 28 can extend substantially parallel to awning fabric 24 and can be connected to opposing ends of end rail 30 to support end rail 30 at a distance from vehicle body 18. Support rails 32 and 34 extend diagonally from vehicle body 18 to connect to distal ends of support rails 32 and 34, respectively, so as to support awning frame 22 and awning fabric 24 with an angled orientation. In some embodiments, awning 12 can be a retractable awning and awning frame 22 can be a retractable frame. For example, some or all of side rails 26 and 28 and end rails 32 and 34 can be telescoping rails that allow for awning frame to extend and retract.

In some embodiments, awning 12 can be positioned and configured differently than as illustrated. For example, awning 12 can be a non-retractable awning. In some embodiments, awning 12 can be attached to a structure other than vehicle 10, such as a patio, house, or building. In some embodiments, awning 12 can be a portable awning.

Awning airfoil system 14 can be connected to awning 12. As illustrated in FIG. 1, awning airfoil system 14 is attached to awning 12 and positioned along an edge of awning 12 near side rail 28. One or more additional awning airfoil systems (not shown) can also be attached to awning 12, for example along the edge of awning 12 near side rail 28 positioned next to awning airfoil system 14 and/or along an edge of awning 12 near side rail 26 positioned opposite awning airfoil system 14.

Awning airfoil system 14 can attach airfoils 36 and 38 to the awning 12. Airfoil 36 can be positioned along an edge of awning 12 above awning 12 and airfoil 38 can be positioned along the edge of awning 12 below awning 12. Airfoils 36 and 38 can spoil aerodynamic flow of air across awning 12 to reduce flapping by awning 12 during windy conditions.

Figure 2:
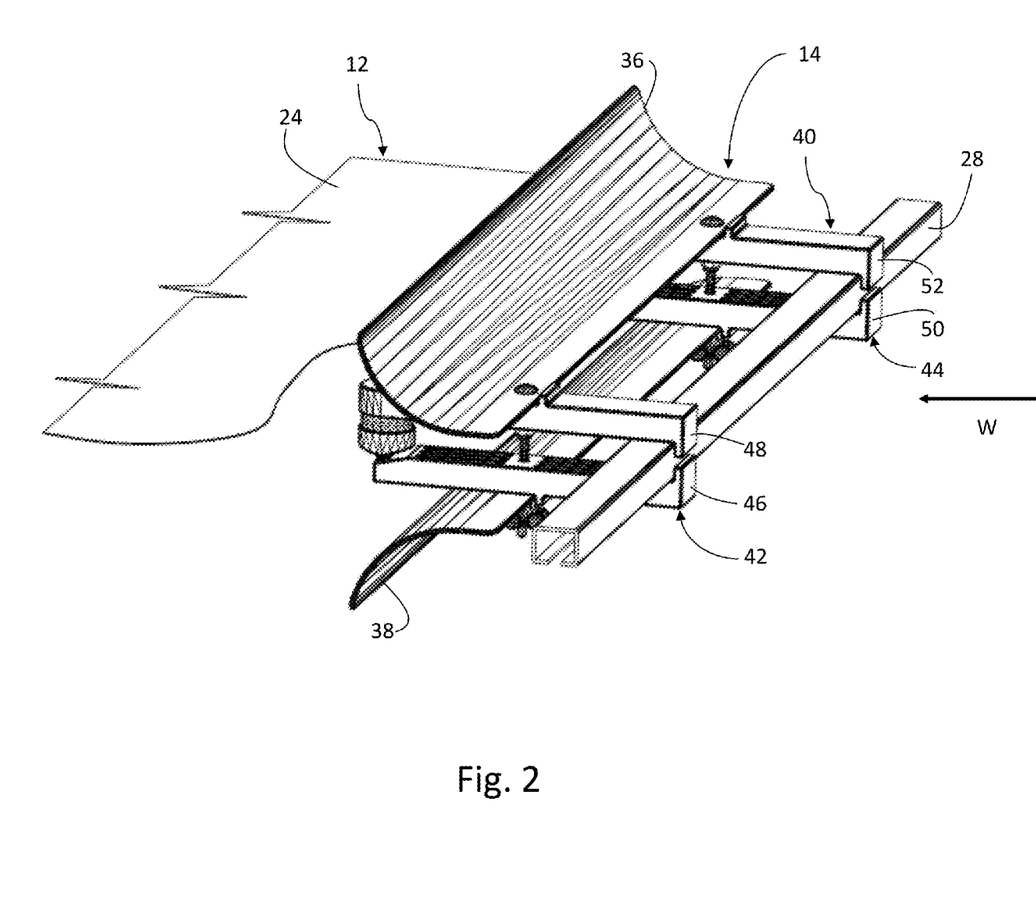
FIG. 2 is a schematic perspective view of the awning airfoil system and a portion of the awning of FIG. 1, viewed from a top, windward direction.

FIG. 2 is a schematic perspective view of awning airfoil system 14 and a portion of awning 12, viewed from a top, windward direction. In an example illustrated in FIG. 2, wind is blowing in prevailing wind direction W toward side rail 28 and across awning 12. Awning airfoil system 14 includes awning fastener 40 connected to airfoils 36 and 38 and can fasten awning airfoil system 14 to awning 12. In some embodiments, awning fastener 40 can be a clamp system including clamps 42 and 44, each including lower and upper clamp arms 46, 48, 50, and 52. Clamps 42 and 44 can attach airfoils 36 and 38 to side rail 28.

Figure 3:
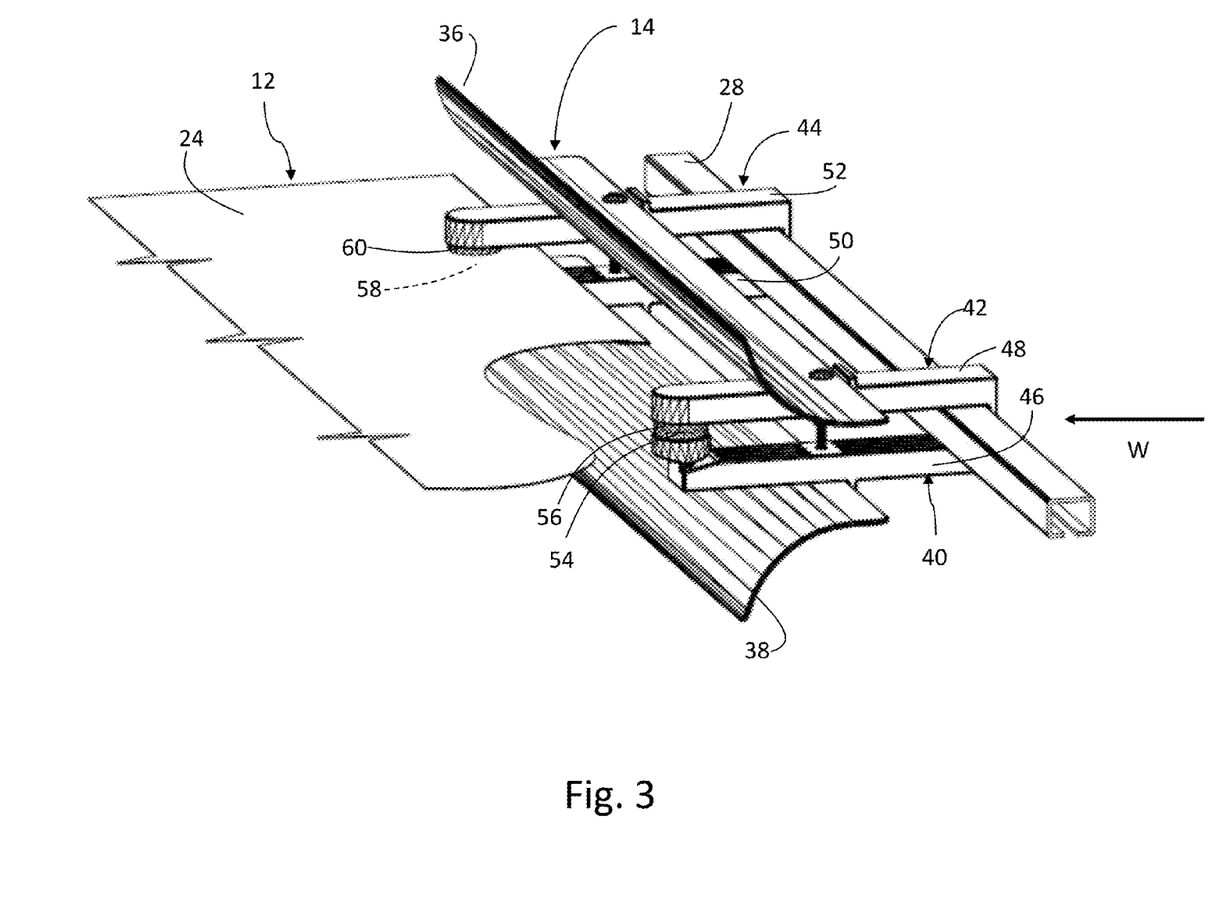
FIG. 3 is a schematic perspective view of the awning airfoil system and a portion of the awning of FIG. 1, viewed from a top, leeward direction.

FIG. 3 is a schematic perspective view of awning airfoil system 14 and a portion of awning 12, viewed from a top, leeward direction with respect to prevailing wind direction W. A portion of awning fabric 24 is cut away in FIG. 3 to show pads 54 and 56 attached at ends of clamp arms 46 and 48, respectively. Awning fastener 40 can also include pads 58 and 60 (with pad 58 obscured by awning fabric 24) attached at ends of clamp arms 50 and 52, respectively. Pads 54, 56, 58 and 60 can be relatively pliable and resilient, as suitable for the application, for attaching awning airfoil system 14 to awning fabric 24. In some embodiments, clamp arms 46, 48, 50, and 52 can be relatively rigid and pads 54, 56, 58, and 60 can be relatively pliable and resilient.

Figure 4:
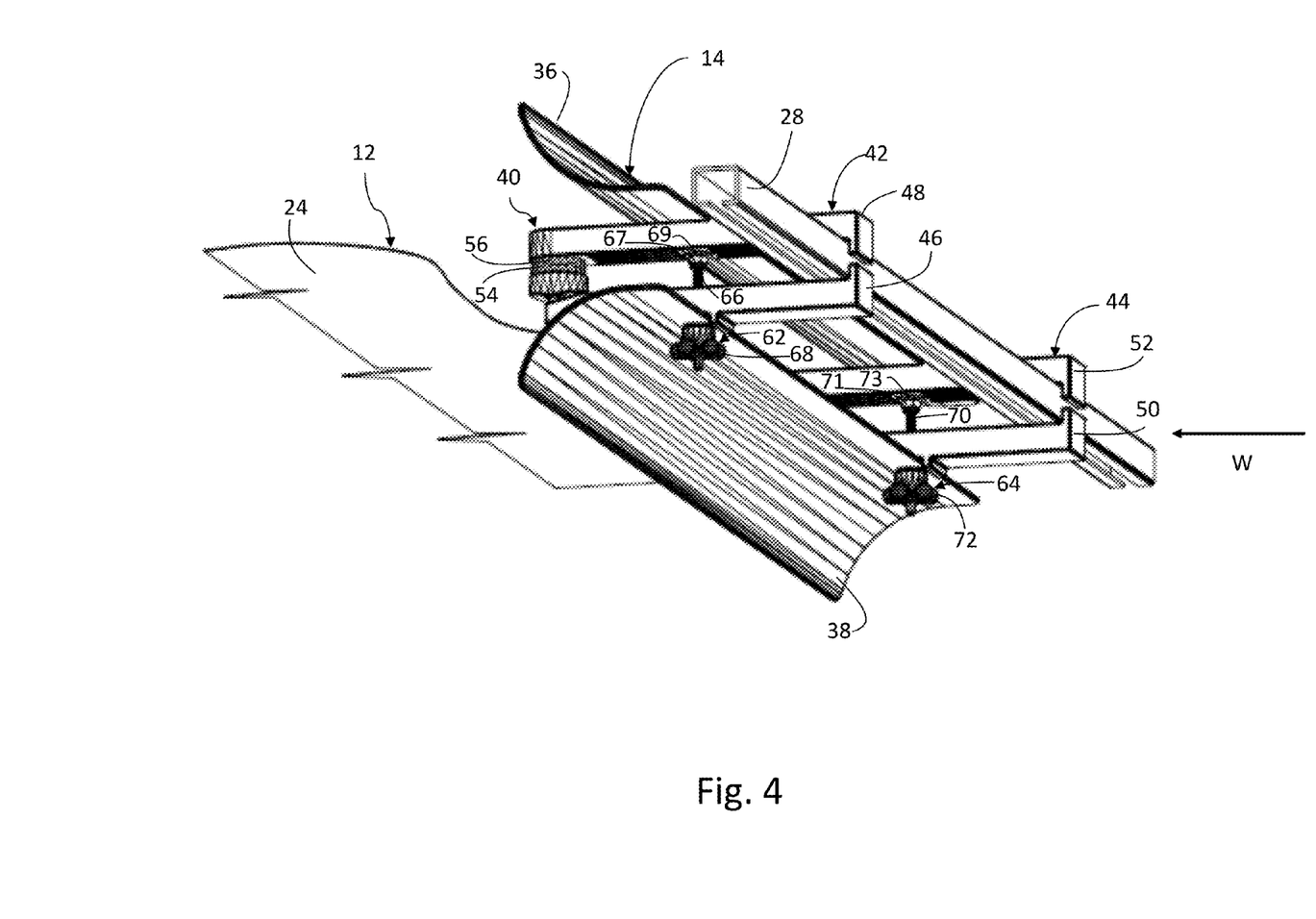
FIG. 4 is a schematic perspective view of the awning airfoil system and a portion of the awning of FIG. 1, viewed from a bottom, windward direction.

FIG. 4 is a schematic perspective view of awning airfoil system 14 and a portion of awning 12, viewed from a bottom, windward direction with respect to prevailing wind direction W. FIG. 4 shows connector 62 connecting clamp arm 46 to clamp arm 48 and connector 64 connecting clamp arm 50 to clamp arm 52. Connector 62 includes bolt 66 extending through holes in clamp arms 46 and 48 and includes knob 68 threaded on an end of bolt 66. Knob 68 can be tightened to tighten clamp arms 46 and 48 on side rail 28 and on awning fabric 24. Connector 64 includes bolt 70 extending through holes in clamp arms 50 and 52 and includes knob 72 threaded on an end of bolt 70. Knob 72 can be tightened to tighten clamp arms 50 and 52 on side rail 28 and on awning fabric 24.

In some embodiments, connector 62 can also include lock nut 67 and washer 69 located below clamp arm 48 that rigidly connects clamp arm 48 to airfoil 36 via bolt 66. Connector 64 can also include lock nut 71 and washer 73 located below clamp arm 48 that rigidly connects clamp arm 48 to airfoil 36 via bolt 70. Lock nuts 67 and 71 and washers 69 and 73 can help facilitate connecting and disconnecting awning airfoil system 14 to and from awning 12. In other embodiments, some or all of lock nuts 67 and 71 and washers 69 and 73 can be omitted.

Figure 5:
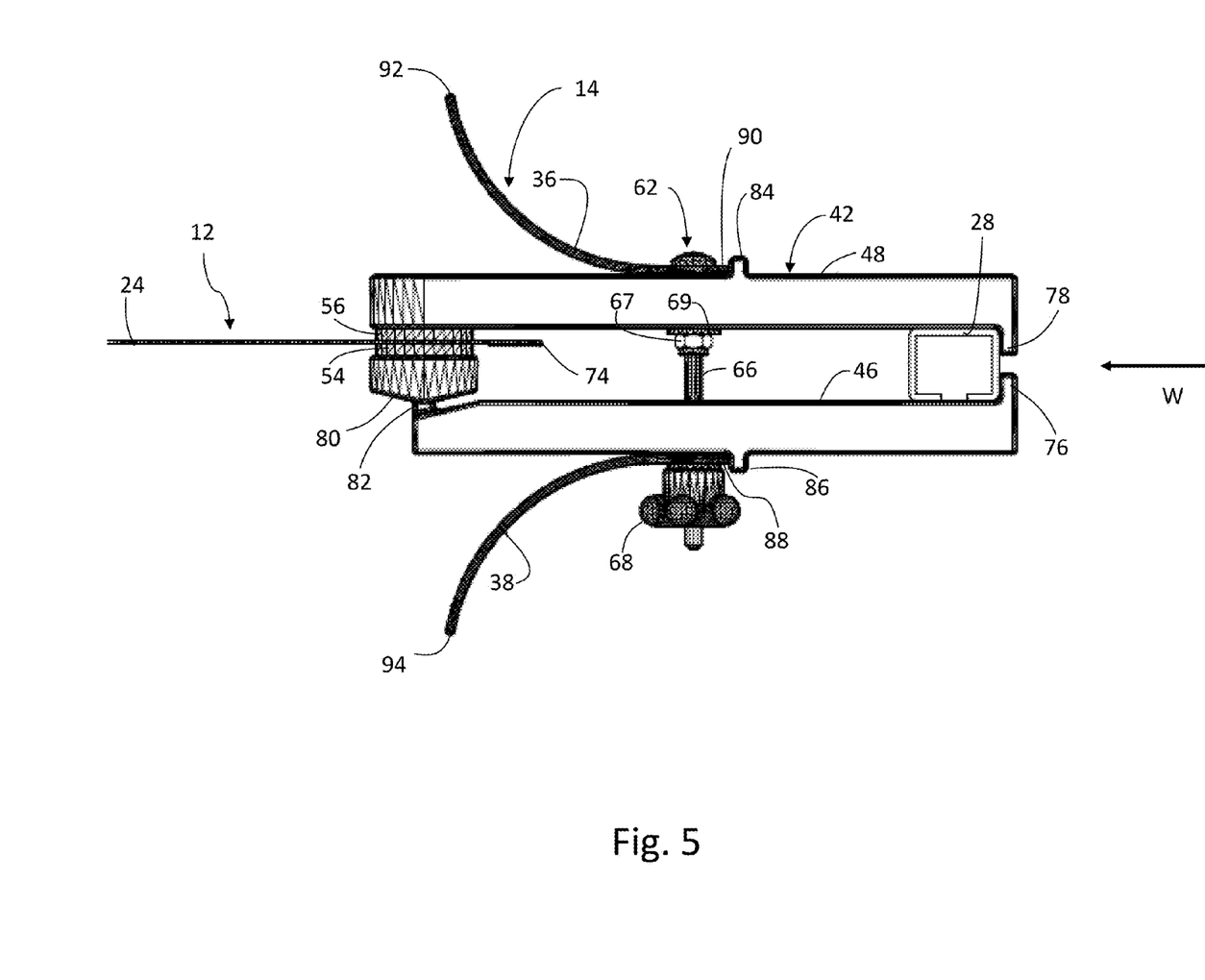
FIG. 5 is a schematic end view of the awning airfoil system and a portion of the awning of FIG. 1.

FIG. 5 is a schematic end view of awning airfoil system 14 and a portion of awning 12. As shown in FIG. 5, a gap is defined between edge 74 of awning fabric 24 and side rail 28. Clamp 42 can extend over the gap so as to clamp upon both awning fabric 24 and side rail 28. Clamp 42 includes rims 76 and 78 to hold clamp 42 to side rail 28. Rim 76 can extend upward from a windward end of clamp arm 46 and rim 78 can extend downward from a windward end of clamp arm 48 such that both rims 76 and 78 extend inward toward side rail 28. In some embodiments, rims 76 and 78 can keep awning airfoil system 14 from sliding leeward when blown by wind. In some embodiments, rims 76 and 78 can resist twisting by awning airfoil system 14 in windy conditions.

Clamp 42 includes pads 54 and 56 to hold clamp 42 to awning fabric 24. Pad 54 can extend upward from a leeward end of clamp arm 46 and pad 56 can extend downward from a leeward end of clamp arm 48 such that both pads 54 and 56 extend inward toward awning fabric 24. In some embodiments, pad 56 can be mounted rigidly to clamp arm 48 and pad 54 can be mounted hingedly to clamp arm 46. For example, in some embodiments, pad 54 can be mounted to foot 80, which can be pivotably connected to pivot mount 82 at the leeward end of clamp arm 46. Foot 80 can pivot about an axis that is perpendicular to a longitudinal length of clamp arm 46. This pivoting movement of foot 80 and pad 54 can allow for pad 54 to rock and adjust to different relative angles as appropriate for use with a given awning 12. This can allow awning airfoil system 14 to be used with various awnings 12 having relatively thick or thin side rails 28, and still allow pads 54 and 56 to meet at a substantially flat interface even when clamp arms 46 and 48 are non-parallel. Knob 68 on connector 62 can be adjusted to adjust for size variation in a given side rail 28.

Clamp 42 can connect airfoils 36 and 38 to opposite sides of awning 12 along an edge of awning 12. In some embodiments, airfoil 36 can be connected to a top side of clamp arm 48, and airfoil 38 can be connected to a bottom side of clamp arm 46. Bolt 66 can extend through holes in airfoils 36 and 38 as well as clamp arms 46 and 48 so as to form a connected awning airfoil system 14.

In some embodiments, awning airfoil system 14 can include alignment guides 84 and 86 for aligning airfoils 36 and 38. For example, alignment guides 84 and 86 can be ridges extending from clamp arms 46 and 48. Alignment guide 86 can extend from a bottom side of clamp arm 46 proximate leading edge 88 of airfoil 38. Alignment guide 84 can extend from a top side of clamp arm 48 proximate leading edge 90 of airfoil 36. Alignment guides 84 and 86 can help retain airfoils 36 and 38 to be oriented perpendicular to clamp 42 during operation of awning airfoil system 14. Clamp 44 (not shown in FIG. 5) can have similar alignment guides which cooperate with alignment guides 84 and 86 to retain airfoils 36 and 38 oriented perpendicular to clamps 42 and 44 during operation of awning airfoil system 14.

While clamp 44 (not shown in FIG. 5) is obscured by clamp 42 in FIG. 5, it should be understood that structure and operation of clamp 44 can be similar to that shown and described with respect to clamp 42. Clamps 42 and 44 can be used together for attaching awning airfoil system 14 to awning 12. In other embodiments, awning airfoil system 14 can be used with more or fewer than two clamps 42 and 44 as suitable for the application. For example, shape of clamp 42 could be modified such that a single clamp 42 is suitable for retaining awning airfoil system 14 to awning 12.

In some embodiments, awning airfoil system 14 can be configured with one or both of the airfoils 36 and 38 angled away from clamp 42. For example, airfoil 36 is illustrated in FIG. 5 with leading edge 90 of airfoil 36 positioned proximate clamp 42 and trailing edge 92 spaced away from clamp 42. Airfoil 36 can be curved from leading edge 90 to trailing edge 92 such that airfoil 36 curves away from clamp 42, and consequently, curves away from awning 12. Wind blowing toward awning airfoil system 14 generally in windward direction W can be spoiled by airfoil 36. Wind can blow across leading edge 90 and be turned by airfoil 36 to be directed away from awning 12 as that wind passes from leading edge 90 toward and past trailing edge 92. Airfoil 36 can disrupt airflow across a top surface of awning 12 to reduce flapping by awning fabric 24. In some cases, airfoil 36 can increase air turbulence above the top of awning fabric 24, thus reducing laminar air flow, reducing air flow speed, and/or reducing propensity to cause awning fabric 24 to flap aggressively.

Airfoil 38 is illustrated in FIG. 5 with leading edge 88 of airfoil 38 positioned proximate clamp 42 and trailing edge 94 spaced away from clamp 42. In a manner similar to that of airfoil 36, airfoil 38 can be curved from leading edge 88 to trailing edge 94 such that airfoil 38 curves away from clamp 42, and consequently, curves away from awning 12. Wind blowing toward awning airfoil system 14 generally in windward direction W can be spoiled by airfoil 38. Wind can blow across leading edge 88 and be turned by airfoil 38 to be directed away from awning 12 as that wind passes from leading edge 88 toward and past trailing edge 94. Airfoil 38 can disrupt airflow across a bottom surface of awning 12 to reduce flapping by awning fabric 24. In some cases, airfoil 36 can increase air turbulence below the bottom of awning fabric 24, thus reducing laminar air flow, reducing air flow speed, and/or reducing propensity to cause awning fabric 24 to flap aggressively.

Together, airfoils 36 and 38 can spoil air flow across both the top and bottom of awning 12 to reduce flapping of awning fabric 24. Airfoils 36 and 38 can work together to reduce flapping of awning fabric 24, for example, during weather conditions in which wind direction changes. Spoiling airflow across both the top and bottom of awning via airfoils 36 and 38 can reduce flapping by awning fabric 24 even when there is a change in prevailing wind direction W and/or an instantaneous wind direction.

Airfoils 36 and 38 can be positioned proximate an edge of awning 12 to spoil airflow across awning 12. In some embodiments, airfoils 36 and 38 can be positioned leeward of a windward-most edge of the awning 12. For example, as illustrated in FIG. 5, airfoils 36 and 38 are positioned leeward of side rail 28 with leading edges 88 and 90 of airfoils 36 and 38 facing side rail 28. Leading edges 88 and 90 of airfoils 36 and 38 can be laterally aligned with the gap between edge 74 of awning fabric 24 and side rail 28. In other embodiments, airfoils 36 and 38 can be positioned aligned with and/or windward of side rail 28 with leading edges 88 and 90 facing away from side rail 28.

In some embodiments, airfoils 36 and 38 can curve between their leading edges 88, 90 and trailing edges 92, 94 so as to define a substantially concave surface. For example, in some embodiments, airfoils 36 and 38 can curve substantially continuously between their leading edges 88, 90 and trailing edges 92, 94. In one embodiment, airfoils 36 and 38 can be formed as quarter pipes with a substantially constant arc radius such that a tangent of leading edge 90 is substantially perpendicular to a tangent of trailing edge 92 and a tangent of leading edge 88 is perpendicular to a tangent of trailing edge 94. In other embodiments, airfoils 36 and 38 can have a greater or lesser curvature as suitable for the application.

In other embodiments, airfoils 36 and 38 can have one or more curved portions and one or more straight portions between their leading edges 88, 90 and trailing edges 92, 94. In other embodiments, airfoils 36 and 38 can extend from clamp 42 with little or no curve. For example, airfoils 36 and 38 can be substantially straight airfoils with leading edges 88 and 90 positioned adjacent clamp 42 and with trailing edges 92 and 94 spaced away from clamp 42 so as to spoil air flow across awning airfoil system 14 and awning 12. In some embodiments, airfoils 36 and 38 could be angled with respect to clamp 42 and/or awning 12 by greater than about 15 degrees. In some embodiments, airfoils 36 and 38 could be angled with respect to clamp 42 and/or awning 12 by between about 30 to about 45 degrees.

Awning airfoil system 14 can be sized to spoil air flow across awning airfoil system 14 and awning 12 and reduce flapping by awning 12. In some embodiments, airfoils 36 and 38 can be sized with a length of between about 24 inches and about 60 inches. In some airfoils 36 and 38 can be sized with a length of between about 24 inches and about 42 inches. In some airfoils 36 and 38 can be sized with a length of about 30 inches.

In some embodiments, airfoils 36 and 38 can be sized with a depth between their leading edges 88, 90 and trailing edges 92, 94 of between about 1 inch and about 6 inches. In some embodiments, airfoils 36 and 38 can be sized with a depth between their leading edges 88, 90 and trailing edges 92, 94 of between about 2 inch and about 4 inches. In some embodiments, airfoils 36 and 38 can be sized with a depth between their leading edges 88, 90 and trailing edges 92, 94 of about 3 inches.

Awning airfoil system 14 can be made out of one or more materials suitable for the application such as one or more polymers and or one or more metals. For example, in some embodiments, some or all of airfoils 36 and 38, clamp arms 46 and 48, pads 54 and 56, and foot 80 can all be made of a polymer material, such as polyvinyl chloride (PVC). Bolt 66 can be made of a metal, such as steel. In other embodiments, materials can be varied as suitable for the application.

A number of embodiments of the invention have been described. Nevertheless, it will be understood that various modifications may be made without departing from the spirit and scope of the invention. For example, some embodiments of awnings 12 need not include side rails 26 and 28. In such embodiments, awning fastener 40 can be modified to attach to awning 12 without side rails 26 and 28, for example by clamping to awning fabric 24 alone or in addition to alternative structure. Additionally, specific shape and orientation of various components can be modified and still yield an awning airfoil system suitable for spoiling airflow and reducing flapping of an awning in heavy wind conditions. Accordingly, other embodiments are within the scope of the following claims.

What is claimed is:

1. An apparatus comprising:
an awning fastener configured for attaching to an awning;
a first airfoil connected to the awning fastener; and
a second airfoil connected to the awning fastener and positioned opposite of the first airfoil such that the first and second airfoils are positionable on opposite sides of the awning when the awning fastener is connected to the awning, wherein the first airfoil has a first leading edge positioned proximate the awning fastener and is angled so as to have a first trailing edge spaced away from the awning fastener, and wherein the second airfoil has a second leading edge positioned proximate the awning fastener and is angled so as to have a second trailing edge spaced away from the awning fastener.

2. The apparatus of claim 1, wherein the awning fastener comprises first and second clamps configured for clamping to an awning edge, wherein the first airfoil is connected to tops of the first and second clamps, and wherein the second airfoil is connected to bottoms of the first and second clamps.

3. The apparatus of claim 1, wherein the awning fastener comprises first and second arms and at least one first pad pivotably attached to a first end of the first arm and facing toward a second end of the second arm.

4. The apparatus of claim 3, wherein the awning fastener further comprises a second pad rigidly attached to the second end of the second arm and facing toward the first pad, wherein the first arm includes a first rim extending from a third end of the first arm toward a fourth end of the second arm, and wherein the second arm includes a second rim extending from the fourth end toward the first rim.

5. An apparatus comprising:
an awning fastener configured for attaching to an awning;
a first airfoil connected to the awning fastener; and
a second airfoil connected to the awning fastener and positioned opposite of the first airfoil such that the first and second airfoils are positionable on opposite sides of the awning when the awning fastener is connected to the awning, wherein each of the first and second airfoils are curved with substantially concave surfaces, have a length of between about 24 inches and about 42 inches, and have a depth of between about 2 inches and about 4 inches.

6. The apparatus of claim 5, wherein a first leading edge of the first airfoil abuts a first alignment guide positioned on a top surface of the awning fastener and a second leading edge of the second airfoil abuts a second alignment guide positioned on a bottom surface of the awning fastener.

7. The apparatus of claim 5, and further comprising:
an adjustable connector extending through a first hole near a first leading edge of the first airfoil, through a second hole near a second leading edge of the second airfoil, and through at least one hole of the awning fastener, wherein the adjustable connector is configured to connect the first and second airfoils to the awning fastener and to tighten the awning fastener to the awning.

8. An apparatus comprising:
an awning fastener configured for attaching to an awning;
a first airfoil connected to the awning fastener; and
a second airfoil connected to the awning fastener and positioned opposite of the first airfoil such that the first and second airfoils are positionable on opposite sides of the awning when the awning fastener is connected to the awning, wherein each of the first and second airfoils are angled with respect to the awning fastener by greater than about 15 degrees, have a length of between about 24 inches and about 60 inches, and have a depth of between about 1 inch and about 6 inches.

9. An assembly comprising:
an awning having a first edge; and
the apparatus of claim 1, wherein the awning fastener is connected to the awning proximate the first edge of the awning such that the first airfoil is positioned above a top surface of the awning and the second airfoil is positioned below a bottom surface of the awning.

10. The assembly of claim 9, wherein the awning fastener is clamped to both an awning fabric and a side rail of the awning such that the awning fastener spans a gap extending between the awning fabric and the side rail.

11. A method of attaching the apparatus of claim 1 to an awning, the method comprising:
positioning the first airfoil along a first edge of the awning above the awning;
positioning the second airfoil along the first edge of the awning below the awning; and
attaching the first and second airfoils to the awning.

12. The method of claim 11, and further comprising:
attaching the first and second airfoils to an awning fabric of the awning.

13. The method of claim 11, and further comprising:
attaching the first and second airfoils to a side rail of the awning.

14. The method of claim 13, wherein the awning is a retractable awning attached to a side of a recreational vehicle and wherein the side rail is a telescoping side rail of the awning.

15. The method of claim 11, and further comprising:
attaching the first and second airfoils via the awning fastener which comprises a clamp that attaches to both an awning fabric and a side rail of the awning such that the clamp spans a gap extending between the awning fabric and the side rail.

16. The method of claim 11, wherein the first and second airfoils each have a length and a width, with the length being longer than the with, and the method further comprising:
attaching the first and second airfoils with the length of the airfoils aligned substantially parallel to a side edge of the awning.

17. The method of claim 11, and further comprising:
positioning a third airfoil along a second edge of the awning above the awning;
positioning a fourth airfoil along the second edge of the awning below the awning; and
attaching the first and second airfoils to the awning.

18. The method of claim 17, wherein the second edge is an edge of the awning opposite the first edge of the awning.

19. The method of claim 11, and further comprising:
spoiling airflow via the first and second airfoils so as to reduce flapping of fabric of the awning.

20. A method of attaching the apparatus of claim 8 to an awning, the method comprising:
positioning the first airfoil along a first edge of the awning above the awning;
positioning the second airfoil along the first edge of the awning below the awning; and
attaching the first and second airfoils to the awning; and
attaching the first and second airfoils to a side rail of the awning such that first and second leading edges of the airfoils face toward the side rail and first and second trailing edges curve away from awning fabric of the awning.

* * * * *